(12) United States Patent
Iwatsu et al.

(10) Patent No.: US 10,036,095 B2
(45) Date of Patent: Jul. 31, 2018

(54) ELECTROLYTIC TREATMENT METHOD AND ELECTROLYTIC TREATMENT APPARATUS

(71) Applicants: TOKYO ELECTRON LIMITED, Tokyo (JP); National University Corporation Kumamoto University, Kumamoto (JP)

(72) Inventors: Haruo Iwatsu, Kumamoto (JP); Hidenori Akiyama, Kumamoto (JP)

(73) Assignees: TOKYO ELECTRON LIMITED, Tokyo (JP); NATIONAL UNIVERSITY CORPORATION KUMAMOTO UNIVERSITY, Kumamoto (JP)

( * ) Notice: Subject to any disclaimer, the term of this patent is extended or adjusted under 35 U.S.C. 154(b) by 441 days.

(21) Appl. No.: 14/892,269

(22) PCT Filed: May 12, 2014

(86) PCT No.: PCT/JP2014/062585
§ 371 (c)(1),
(2) Date: Nov. 19, 2015

(87) PCT Pub. No.: WO2014/188898
PCT Pub. Date: Nov. 27, 2014

(65) Prior Publication Data
US 2016/0083856 A1    Mar. 24, 2016

(30) Foreign Application Priority Data
May 20, 2013  (JP) .................................. 2013-106072
Jan. 8, 2014  (JP) .................................. 2014-001465

(51) Int. Cl.
C25B 7/00       (2006.01)
C25D 17/10      (2006.01)
(Continued)

(52) U.S. Cl.
CPC .................. *C25B 7/00* (2013.01); *C25B 9/12* (2013.01); *C25B 11/00* (2013.01); *C25D 17/10* (2013.01); *C02F 1/467* (2013.01)

(58) Field of Classification Search
None
See application file for complete search history.

(56) References Cited

U.S. PATENT DOCUMENTS 8,147,660 B1 *  4/2012  Mayer .................... C25D 17/10
                                                        204/230.2

FOREIGN PATENT DOCUMENTS

CN      1450207 A       10/2003
JP      2006-348356 A   12/2006
JP      2012-132058 A    7/2012

OTHER PUBLICATIONS

International Search Report dated Aug. 5, 2014 in PCT/JP2014/062585.

* cited by examiner

*Primary Examiner* — Arun S Phasge
(74) *Attorney, Agent, or Firm* — Rothwell, Figg, Ernst & Manbeck, P.C.

(57) ABSTRACT

An electrolytic treatment method in which a predetermined treatment is performed using treatment subject ions contained in a treatment liquid, the method including: an electrode positioning step for positioning a direct electrode and a counter electrode so as to sandwich the treatment liquid, and positioning an indirect electrode for forming an electric field in the treatment liquid; a treatment subject ion migration step for applying a voltage to the indirect electrode and thereby moving the treatment subject ions in the treatment liquid to the counter electrode side; and a treatment subject ion redox step for applying a voltage between the direct electrode and the counter electrode and thereby (Continued)

oxidizing or reducing the treatment subject ions which have migrated to the counter electrode side.

26 Claims, 7 Drawing Sheets

(51) Int. Cl.
*C25B 9/12* (2006.01)
*C25B 11/00* (2006.01)
*C02F 1/467* (2006.01)

FIG.13

ELECTROLYTIC TREATMENT METHOD AND ELECTROLYTIC TREATMENT APPARATUS

CROSS REFERENCE TO RELATED APPLICATION

This application is a 35 U.S.C. 371 National Phase Entry Application from PCT/JP2014/162585, filed May 12, 2014, which claims priority to Japanese Patent Application Nos. 2013-106072, filed May 20, 2013 and 2014-001465, filed Jan. 8, 2014, the disclosures of which are incorporated herein in their entirety by reference.

TECHNICAL FIELD

The present disclosure relates to an electrolytic treatment method for performing a predetermined treatment using ions to be treated ("treatment target ions") contained in a treatment liquid, and an electrolytic treatment apparatus for executing the electrolytic treatment method.

BACKGROUND ART

An electrolysis process (an electrolytic treatment) is a technology used for various treatments such as, for example, a plating treatment or an etching treatment.

Such a plating treatment is performed by, for example, a plating apparatus disclosed in Patent Document 1. The plating apparatus includes a plating bath that stores a plating liquid, and the interior of the plating bath is partitioned by a regulation plate. An anode is arranged in one partitioned section, and an object to be processed (a substrate) ("workpiece") is immersed in the other section so that a potential distribution between the anode and the workpiece is adjusted by the regulation plate. Then, after the workpiece is immersed in the plating liquid within the plating bath, a voltage is applied using the anode as a positive pole and the workpiece as a negative pole so that a current flows between the anode and the workpiece. The plating treatment is performed by moving the metal ions in the plating liquid to the workpiece side by the current, and then precipitating the metal ions as a plated metal at the workpiece side.

Also, for example, in a plating apparatus disclosed in Patent Document 2, the plating liquid is stirred and circulated within a plating bath while a plating treatment is performed on a workpiece is subjected to a plating treatment.

PRIOR ART DOCUMENT

Patent Document

Patent Document 1: Japanese Patent Laid-Open Publication No. 2012-132058
Patent Document 2: Japanese Patent Laid-Open Publication No. 2006-348356

SUMMARY OF INVENTION

Problems to be Solved

Here, in order to improve a plating rate in the plating treatment, it may be considered that, for example, the electric field is set to be high in the plating treatment disclosed in Patent Document 1, or the plating liquid is stirred and circulated as disclosed in Patent Document 2.

However, when the electric field is set to be high as in Patent Document 1, the electrolysis of water also may proceed. In such a case, voids occur in the plated metal precipitated on the workpiece by hydrogen bubbles produced by the electrolysis of water. Also, when the plating liquid is stirred as in Patent Document 2, a large-scale stirring mechanism is required. Also, in the apparatus configuration, there may be a case in which such a stirring mechanism cannot be provided.

Also, for example, in the plating treatment disclosed in Patent Document 1, even when sufficient metal ions are not accumulated on the workpiece side, the current flows between the anode and the workpiece. Thus, the efficiency of the plating treatment is poor.

Also, when the plating treatment is performed in a state where sufficient metal ions are not accumulated as described above, that is, when precipitation is sequentially performed from metal ions that have reached the workpiece, the plated metal is unevenly precipitated on the workpiece, so that the plating treatment is not uniformly performed. Moreover, since crystals in the plated metal do not become dense, there is room for improvement in quality.

The present disclosure has been made in view of such problems, and an object of the present disclosure is to efficiently and properly perform a predetermined treatment on a workpiece using treatment target ions in the treatment liquid.

Means for Solving the Problems

In order to achieve the object described above, the present disclosure provides an electrolytic treatment method for performing a predetermined treatment using treatment target ions contained in a treatment liquid. The electrolytic treatment method includes: an electrode arrangement step of arranging each of a direct electrode and a counter electrode such that the treatment liquid is interposed therebetween, and arranging an indirect electrode to form an electric field in the treatment liquid; a treatment target ion migration step of causing the treatment target ions in the treatment liquid to migrate to the counter electrode side by applying a voltage to the indirect electrode; and a treatment target ion redox step of oxidizing or reducing the treatment target ions that have migrated to the counter electrode side by applying a voltage between the direct electrode and the counter electrode.

For example, in a case where the treatment target ions are cations, when an electric field (electrostatic field) is formed by applying a voltage to the indirect electrode, negatively charged particles are gathered to the indirect electrode and direct electrode side, and the treatment target ions migrate to the counter electrode side. Then, a voltage is applied in a state where the direct electrode is set to a positive pole and the counter electrode is set to a negative pole so that a current flows between the direct electrode and the counter electrode. Then, the charges of the treatment target ions that have migrated to the counter electrode side are exchanged so that the treatment target ions are reduced.

Also, for example, in the same way, in a case where the treatment target ions are anions, when an electric field is formed by applying a voltage to the indirect electrode, the treatment target ions are caused to migrate to the counter electrode side. Then, a voltage is applied in a state where the direct electrode is set to a negative pole and the counter electrode is set to a positive pole so that a current flows between the direct electrode and the counter electrode. Then, the charges of the treatment target ions that have migrated to the counter electrode side are exchanged so that the treatment target ions are oxidized.

As described above, in the present disclosure, the migration of treatment target ions by the indirect electrode, and the oxidation or reduction (hereinafter, which may be simply referred to as "redox") of treatment target ions by the direct electrode and the counter electrode are individually performed. Thus, when the treatment target ions are caused to migrate by the indirect electrode, charge exchange of the treatment target ions is not carried out. Accordingly, unlike the conventional art, the electrolysis of water is suppressed, and it is possible to increase the electric field at the time of applying a voltage to the indirect electrode. The treatment target ions quickly migrate due to the high electric field, so that the rate of the electrolytic treatment may be improved. Furthermore, a conventional large-scale mechanism for stirring and circulating the plating liquid is not needed in order to improve the rate of the electrolytic treatment, and thus an apparatus configuration may be simplified.

Also, the redox of treatment target ions may be performed in a state where sufficient treatment target ions are accumulated on the counter electrode side. Thus, unlike the conventional art, it is not necessary to cause a lot of current to flow between an anode and a workpiece, and the treatment target ions may be efficiently reduced or oxidized.

Also, since the charge exchange, that is, the electrolytic treatment, is performed after the treatment target ions are substantially uniformly arranged on the counter electrode surface, a uniform and excellent film quality may be achieved.

According to another aspect, the present disclosure provides an electrolytic treatment apparatus for performing a predetermined treatment using treatment target ions contained in a treatment liquid. The electrolytic treatment apparatus includes: a direct electrode and a counter electrode that are arranged such that the treatment liquid is interposed therebetween, and further an indirect electrode configured to form an electric field in the treatment liquid. The indirect electrode causes treatment target ions in the treatment liquid to migrate to the counter electrode side when a voltage is applied thereto, and the direct electrode reduces or oxidizes the treatment target ions that have migrated to the counter electrode side when a voltage is applied between the direct electrode and the counter electrode.

Effect of the Invention

According to the present disclosure, a predetermined treatment on a workpiece may be efficiently and properly performed using treatment target ions in a treatment liquid.

DETAILED DESCRIPTION TO EXECUTE THE INVENTION

Figure 1:
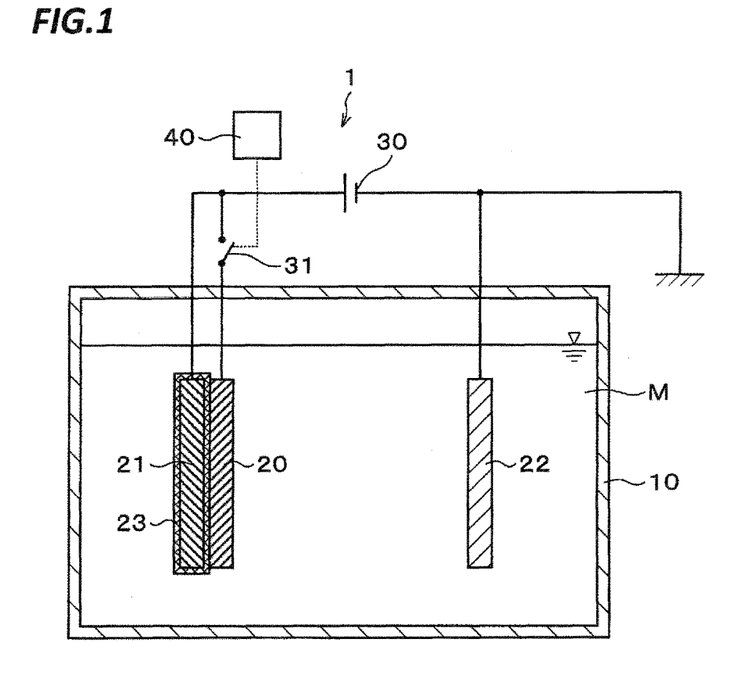
FIG. 1 is a vertical sectional view schematically illustrating a configuration of a plating treatment apparatus according to an exemplary embodiment.

Hereinafter, an exemplary embodiment of the present disclosure will be described. In the present exemplary embodiment, descriptions will be made on a case where a plating treatment is performed as an electrolytic treatment according to the present disclosure. FIG. 1 is a vertical sectional view schematically illustrating a configuration of a plating treatment apparatus 1 as an electrolytic treatment apparatus according to the present exemplary embodiment. Also, in the drawings used in the following description, dimensions of each constituent element are intended to give priority to easy understanding of a technology and do not necessarily correspond to actual dimensions.

The plating treatment apparatus 1 includes a plating bath 10 that stores a plating liquid M as a treatment liquid therein. As for the plating liquid M, for example, a mixed liquid obtained by dissolving copper sulfate and sulfuric acid is used. The plating liquid M contains copper ions as treatment target ions.

A direct electrode 20, an indirect electrode 21 and a counter electrode 22 are arranged within the plating bath 10 to be immersed in the plating liquid M.

An insulating material 23 is provided on the indirect electrode 21 to cover the indirect electrode 21. The direct electrode 20 and the indirect electrode 21 have the same shapes, respectively, and are arranged in a front-rear side integrated manner through the insulating material 23. Also, the "front-rear side integrated manner" referred to herein indicates that, for example, the front surface of the direct electrode 20 and the rear surface of the indirect electrode 21 are abutted on each other through the insulating material 23 so that the direct electrode 20 and the indirect electrode 21 have an integrated structure.

The counter electrode 22 is provided to be common to the direct electrode 20 and the indirect electrode 21. Also, the counter electrode 22 is arranged to face the direct electrode 20 and the indirect electrode 21 across the plating liquid M.

Also, in the present exemplary embodiment, the counter electrode 22 is a workpiece to be subjected to a plating treatment.

A DC power source 30 is connected to the direct electrode 20, the indirect electrode 21, and the counter electrode 22. Each of the direct electrode 20 and the indirect electrode 21 is connected to a positive electrode side of the DC power source 30. The counter electrode 22 is connected to a negative electrode side of the DC power source 30. Also, a switch 31 is provided between the direct electrode 20 and the DC power source 30 to switch a connection state between the direct electrode 20 and the DC power source 30. Turning on/off of the switch 31 is controlled by a controller 40. Then, in a state where the switch 31 is turned on, the direct electrode 20 and the DC power source 30 are connected to each other so that a current flows between the direct electrode 20 and the counter electrode 22. Also, in a state where the switch 31 is turned off, the direct electrode 20 and the DC power source 30 are disconnected from each other so that a current does not flow between the direct electrode 20 and the counter electrode 22.

Hereinafter, a plating treatment using the plating treatment apparatus 1 configured as described above will be described.

Figure 2:
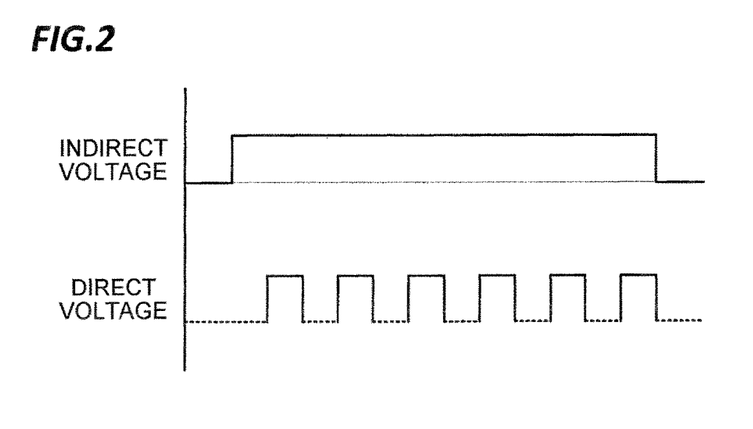
FIG. 2 is a graph illustrating a state in which a DC voltage is continuously applied between an indirect electrode and a counter electrode, while a DC voltage is applied in a pulsed form between a direct electrode and a counter electrode.

As illustrated in FIG. 2, while a DC voltage is continuously applied between the indirect electrode 21 and the counter electrode 22, a so-called pulse voltage is applied between the direct electrode 20 and the counter electrode 22. The pulse voltage refers to a DC voltage applied in a pulsed form.

Figure 3:
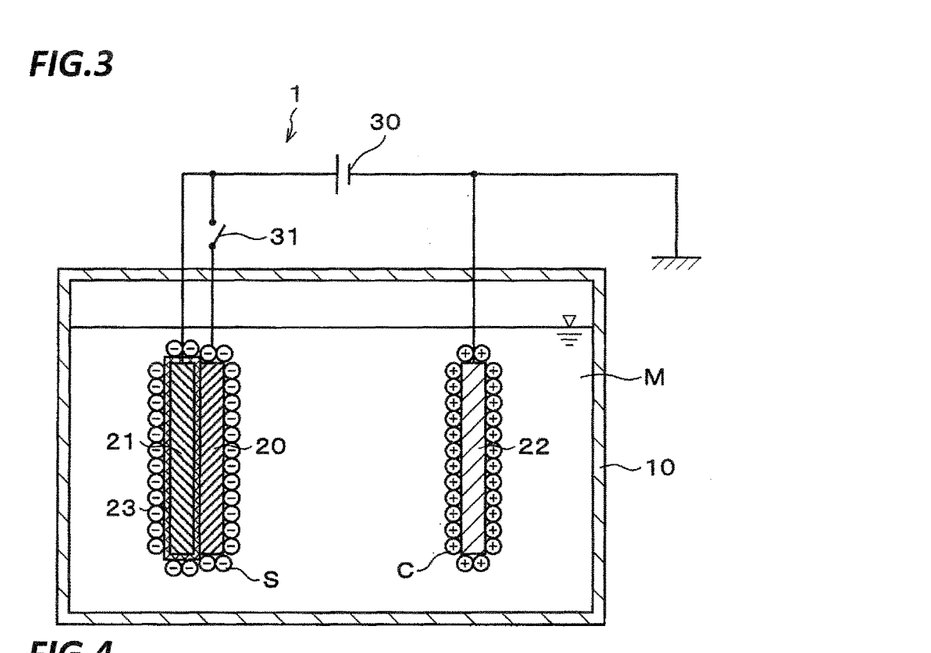
FIG. 3 is an explanatory view illustrating a state in which a voltage is applied between an indirect electrode and a counter electrode.

More specifically, as illustrated in FIG. 3, a DC voltage is applied in a state where the indirect electrode 21 is set to a positive pole and the counter electrode 22 is set to a negative pole to form an electric field (an electrostatic field). Then, sulfate ions S which are negatively charged particles are gathered to the indirect electrode 21 and direct electrode 20 side, and copper ions C which are positively charged particles migrate to the counter electrode 22 side.

Here, the switch 31 is placed in a turned-off state so that the, direct electrode 20 is placed in an electrical floating state. In such a situation, since a charge exchange is not carried out on any of surfaces of the direct electrode 20, the indirect electrode 21, the counter electrode 22, the charged particles attracted by the electrostatic field are arranged on the electrode surfaces. As illustrated in FIG. 3, the copper ions C are substantially uniformly arranged even on the surface of the counter electrode 22 which is a workpiece. Since a charge exchange of the copper ions C is not carried out on the surface of the counter electrode 22, and the electrolysis of water is also inhibited, it is possible to increase the electric field at the time of applying a voltage between the indirect electrode 21 and the counter electrode 22. Also, the copper ions C may quickly migrate due to the high electric field. Also, the copper ions C arranged on the surface of the counter electrode 22 are also arbitrarily controlled by arbitrarily controlling the electric field.

Also, in the present exemplary embodiment, in order to avoid the direct electrode 20 from becoming the negative pole, the direct electrode 20 is not connected to the ground but is placed in an electrical floating state.

Figure 4:
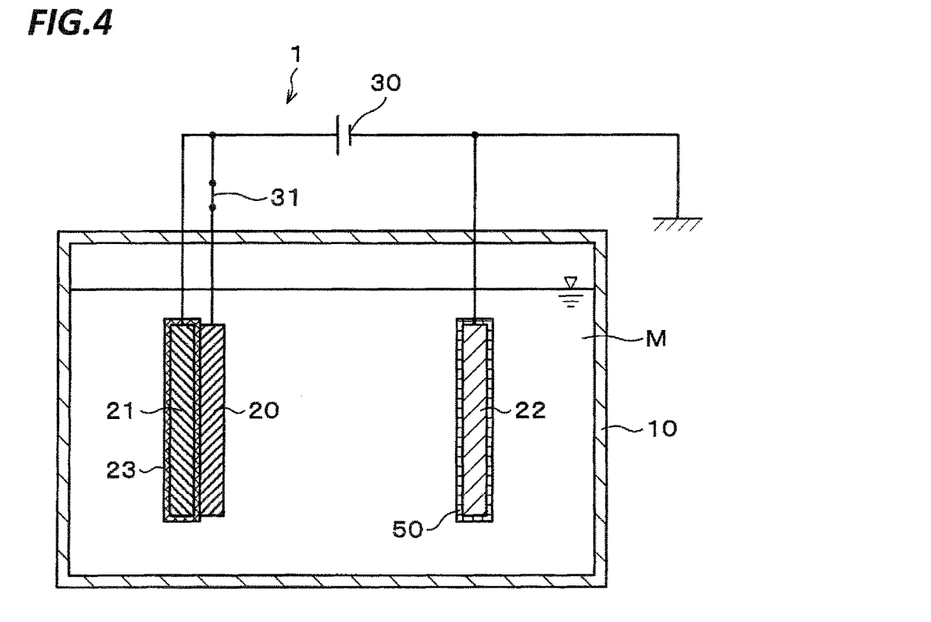
FIG. 4 is an explanatory view illustrating a state in which a voltage is applied between a direct electrode and a counter electrode.

Then, when sufficient copper ions C migrate to and accumulated on the counter electrode 22 side, the switch 31 is turned on as illustrated in FIG. 4. Then, a voltage is applied in a state where the direct electrode 20 is set to a positive pole and the counter electrode 22 is set to a negative pole so that a current flows between the direct electrode 20 and the counter electrode 22. Accordingly, a charge exchange with the copper ions C substantially uniformly arranged on the surface of the counter electrode 22 is performed, and the copper ions C are reduced so that a copper plating 50 is precipitated on the surface of the counter electrode 22. Also, here, the sulfate ions S are being oxidized by the direct electrode 20.

Since the reduction is performed in a state where the sufficient copper ions C are accumulated on the surface of the counter electrode 22 and substantially uniformly arranged, the copper plating 50 may be uniformly precipitated on the surface of the counter electrode 22. As a result, the density of the crystals in the copper plating 50 is increased, and thus the copper plating 50 may be formed in a high quality. In the conventional plating process, a problem arises in that a plated layer becomes uneven due to an electric field intensity distribution on a surface of the workpiece. However, in the present disclosure, since the reduction is performed in a state where copper ions C are substantially uniformly arranged on the surface of the counter electrode 22, a plated layer may be uniformly produced with a high quality.

Figure 5:
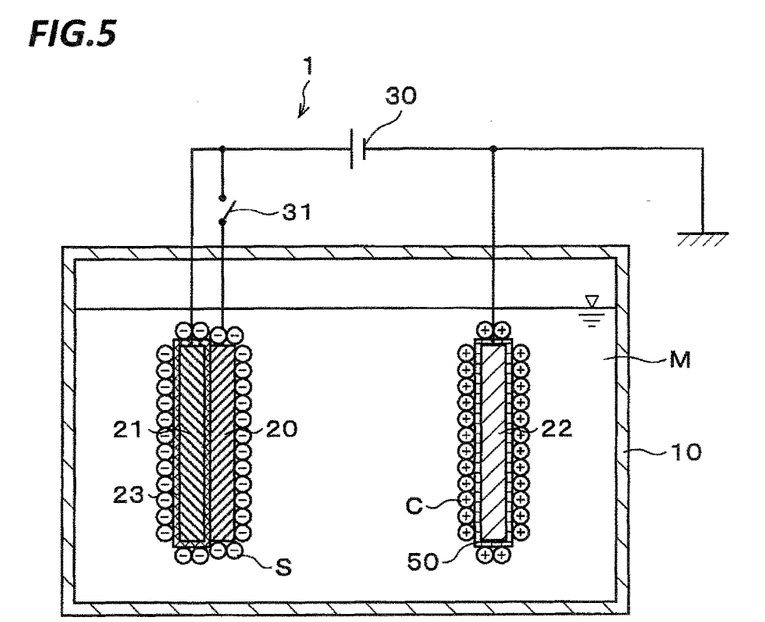
FIG. 5 is an explanatory view illustrating a state in which a voltage is applied again between an indirect electrode and a counter electrode.

Then, as illustrated in FIG. 5, the switch 31 is turned off again, and a voltage is applied between the indirect electrode 21 and the counter electrode 22 so that copper ions C are migrated to and accumulated on the counter electrode 22 side. Then, when sufficient copper ions C are migrated to and accumulated on the counter electrode 22 side, the switch 31 is turned on so that the copper ions C are reduced.

Figure 6:
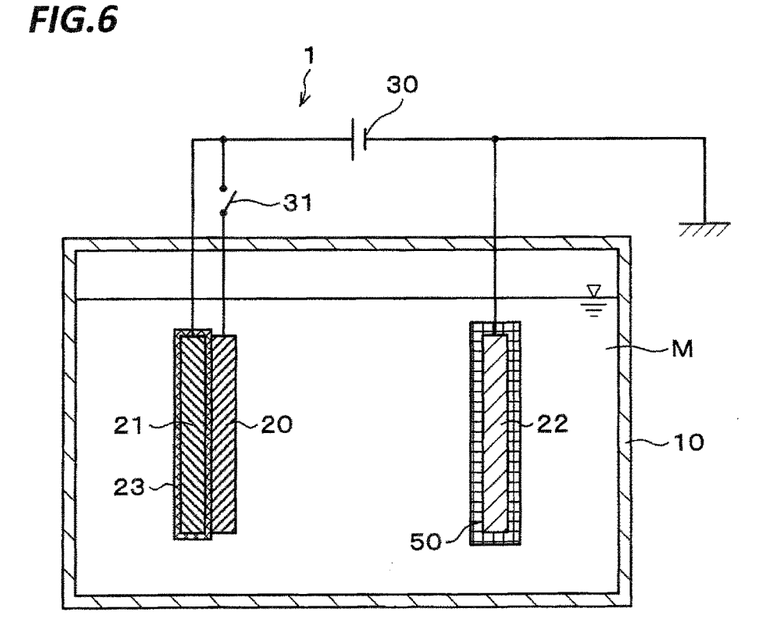
FIG. 6 is an explanatory view illustrating a state in which a predetermined copper plating is formed on a counter electrode.

In this manner, while the migration and accumulation of copper ions C and the reduction of the copper ions C are repeatedly performed, the copper plating 50 is grown to a predetermined film thickness as illustrated in FIG. 6. Thus, in the plating treatment apparatus 1, a series of plating treatments are completed.

According to the exemplary embodiment described above, in a state where copper ions C are caused to migrate and sufficiently gathered to the counter electrode 22 side by applying the voltage between the indirect electrode 21 and the counter electrode 22, the copper ions C may be reduced at the counter electrode 22 side by applying a voltage between the direct electrode 20 and the counter electrode 22. As described above, since the migration of the copper ions C and the reduction of the copper ions C are individually performed by different inter-electrode voltages, the plating treatment may be efficiently performed in a short time.

Also, since the migration of the copper ions C by the indirect electrode 21 and the reduction of the copper ions C by the direct electrode 20 are individually performed, a charge exchange of the copper ions C is not carried out when the copper ions C are caused to migrate by the indirect electrode 21. Therefore, unlike the conventional art, since the electrolysis of water may be suppressed and the occurrence of voids may be suppressed in the copper plating 50, the electric field may be increased at the time of applying a voltage to the indirect electrode 21. Since the copper ions C quickly migrate due to the high electric field, the plating rate of the plating treatment may be improved. Furthermore, since the conventional large-scale mechanism for stirring and circulating the plating liquid is not required in order to improve the plating rate, the apparatus configuration may be simplified.

Also, when a DC voltage is continuously applied between the indirect electrode 21 and the counter electrode 22, copper ions C may always migrate to the counter electrode 22 side. When a DC voltage is applied between the direct electrode 20 and the counter electrode 22 in a pulsed form, the copper ions C may be reduced in a state where the sufficient copper ions C migrate to and accumulated on the counter electrode 22 side. Accordingly, unlike the conventional art, it is not necessary to cause a useless current to flow between the direct electrode and the counter electrode, and the copper ions C may be efficiently reduced.

Also, since the copper ions C substantially uniformly arranged on the surface of the counter electrode 22 may be uniformly reduced, the plating treatment may be uniformly performed. Furthermore, since the copper ions C are substantially uniformly arranged, crystals in the copper plating 50 may be densely arranged. Also, since the DC voltage is applied between the direct electrode 20 and the counter electrode 22 in the pulsed foam, the electrolytic reaction may be subdivided, and also a dense electrolytic reaction is enabled so that a dense copper plating 50 may be precipitated. Accordingly, the quality of a workpiece after the plating treatment may be improved.

Also, since the direct electrode 20 and the indirect electrode 21 are arranged in a front-rear side integrated manner, sulfate ions S may be easily gathered to the indirect electrode 21 and direct electrode 20 side when copper ions C migrate by the indirect electrode 21 to the counter electrode 22 side. Furthermore, since the sulfate ions S are gathered on the direct electrode 20, the oxidation reaction of the sulfate ions S on the direct electrode 20 is promoted when the copper ions C are reduced by the direct electrode 20 and the counter electrode 22. Accordingly, the copper ions C may be more efficiently reduced.

Figure 7:
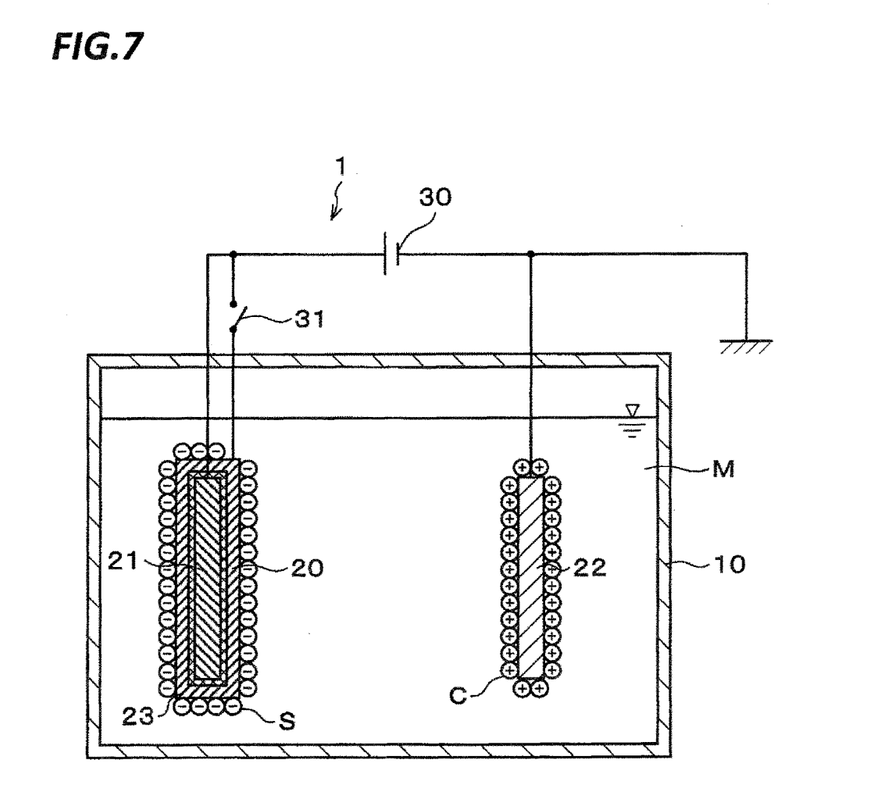
FIG. 7 is a vertical sectional view schematically illustrating a configuration of a plating treatment apparatus according to another exemplary embodiment.

Also, an arrangement method for arranging the direct electrode 20 and the indirect electrode 21 in a front-rear side integrated manner may be considered in various patterns. As illustrated in FIG. 7, the direct electrode 20 may be arranged to completely cover the indirect electrode 21 and the insulating material 23. Through this arrangement, sulfate ions S may be more efficiently gathered on the surface of the direct electrode 20.

Figure 8:
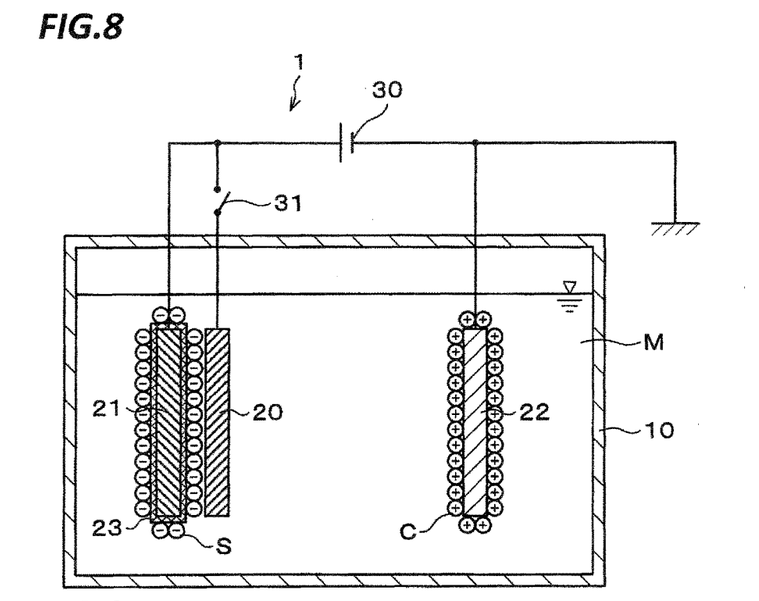
FIG. 8 is a vertical sectional view schematically illustrating a configuration of a plating treatment apparatus according to another exemplary embodiment.

In the exemplary embodiment described above, the direct electrode 20 and the indirect electrode 21 are arranged in a front-rear side integrated manner, but may be arranged to face and to be spaced apart from each other as illustrated in FIG. 8. Even in such a case, copper ions C may migrate to the counter electrode 22 side by the indirect electrode 21, and the copper ions C may be reduced by the direct electrode 20. Accordingly, the same effect as that of the exemplary embodiment described above may be enjoyed. Also, in the example of FIG. 8, the indirect electrode 21 is provided within the plating bath 10, but may be provided outside the plating bath 10.

In the exemplary embodiment described above, the counter electrode 22 is used as an electrode that is common to the direct electrode 20 and the indirect electrode 21, but the indirect electrode 21 does not need to be used as a pair with the counter electrode 22. That is, the indirect electrode 21 may be used alone as a capacitor, and a voltage may be applied to the indirect electrode 21 so as to form an electric field. By the electric field, the sulfate ions S migrate to the indirect electrode 21 and the direct electrode 20 side and the copper ions C migrate to the counter electrode 22 side. Also, it is necessary to use the direct electrode 20 as a pair with the counter electrode 22 because a current is caused to flow between the direct electrode 20 and the counter electrode 22 so as to reduce the copper ions C accumulated at the counter electrode 22 side.

In such a case, a power source of the indirect electrode 21 may be separate from the DC power source 30, that is, the DC power source 30 may not be common to the direct electrode 20 and the indirect electrode 21. A power source for the direct electrode 20 and the indirect electrode 21 may be arbitrarily set.

In the present exemplary embodiment as well, since copper ions C may migrate to the counter electrode 22 side by applying a voltage to the indirect electrode 21, the same effect as that of the exemplary embodiment described above may be enjoyed.

In the exemplary embodiment described above, a case where a plating treatment is performed as an electrolytic treatment has been described, but the present disclosure may be applied to various electrolytic treatments such as, for example, an etching treatment.

Also, in the exemplary embodiment described above, a case where copper ions C are reduced at the counter electrode 22 side has been described, but the present disclosure may also be applied to a case where treatment target ions are oxidized at the counter electrode 22 side.

In such a case, treatment target ions are anions, and the same electrolytic treatment may be performed by setting the positive pole and the negative pole in the exemplary embodiment described above in reverse. That is, an electric field is formed by applying a voltage to the indirect electrode 21, and the treatment target ions are migrated to the counter electrode 22 side. Then, a voltage is applied in a state where the direct electrode 20 is set to a negative pole and the counter electrode 22 is set to a positive pole so that a current flows between the direct electrode 20 and the counter electrode 22. Then, the charges of the treatment target ions that have migrated to the counter electrode 22 side are exchanged so that the treatment target ions are oxidized.

In the present exemplary embodiment as well, although there is a difference in oxidation and reduction of the treatment target ions, the same effect as that of the exemplary embodiment described above may be enjoyed.

In the plating treatment apparatus 1 in the exemplary embodiment described above, the arrangement or the electrode structure of the direct electrode 20, the indirect electrode 21, and the counter electrode 22 may be arbitrarily set.

Figure 9:
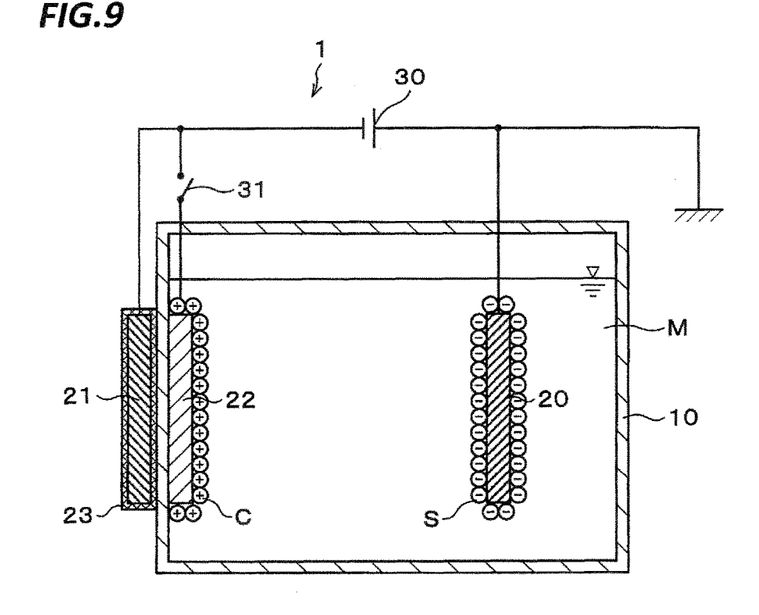
FIG. 9 is a vertical sectional view schematically illustrating a configuration of a plating treatment apparatus according to another exemplary embodiment.

In the exemplary embodiment described above, the indirect electrode 21 is provided at the direct electrode 20 side, but may be provided at the counter electrode 22 side, for example, as illustrated in FIG. 9. The indirect electrode 21 is provided on the outside surface of the plating bath 10, and the counter electrode 22 is provided on the inside surface of the plating bath 10. That is, the indirect electrode 21 and the counter electrode 22 are arranged to face each other with the plating bath 10 being interposed therebetween. Then, the plating bath 10 is configured to be placed in an electrical floating state.

Also, for example, when the plating bath 10 is an insulator, the insulating material 23 provided around the indirect electrode 21 may be omitted. Also, although the indirect electrode 21 is provided on the outside surface of the plating bath 10 in the example of FIG. 9, the indirect electrode 21 may be provided inside the plating bath 10 such that the plating liquid M is interposed between the indirect electrode 21 and the counter electrode 22.

The direct electrode 20 is connected to the positive electrode side of the DC power source 30, and each of the indirect electrode 21 and the counter electrode 22 is connected to the negative electrode side of the DC power source 30. Also, the switch 31, which is provided between the direct electrode 20 and the DC power source 30 in the exemplary embodiment described above, is provided between the counter electrode 22 and the DC power source 30.

In such a plating treatment apparatus 1, while a DC voltage is continuously applied between the direct electrode 20 and the indirect electrode 21, a DC voltage is applied in a pulsed form between the direct electrode 20 and the counter electrode 22. That is, first, a DC voltage is applied in a state where the direct electrode 20 is set to a positive pole and the indirect electrode 21 is set to a negative pole so that sulfate ions S migrate to the direct electrode 20 side, and copper ions C migrate to the indirect electrode 21 side, that is, the counter electrode 22 side. Then, when sufficient copper ions C migrate to and accumulated on the counter electrode 22 side, a voltage is applied in a state where the direct electrode 20 is set to a positive pole and the counter electrode 22 is set to a negative pole so that the copper ions C on the surface of the counter electrode 22 may be reduced, and the copper plating 50 may be precipitated on the surface of the counter electrode 22. Then, the migration and accumulation of copper ions C, and the reduction of the copper ions C are repeatedly performed, and thus a series of plating treatments are performed on the surface of the counter electrode 22.

In the present exemplary embodiment as well, the same effect as that of the exemplary embodiment described above may be enjoyed. Also, an electrode structure of the direct electrode 20, the indirect electrode 21, and the counter electrode 22 may take a variety of forms. When the indirect electrode 21 is provided outside the plating bath 10 as illustrated in FIG. 9, the indirect electrode 21 may be freely designed according to the shape of the plating bath 10.

Also, in the example of FIG. 9, a case where copper ions C are reduced at the counter electrode 22 side has been described, but the present disclosure may also be applied to a case where treatment target ions are oxidized at the counter electrode 22 side as described above.

Figure 10:
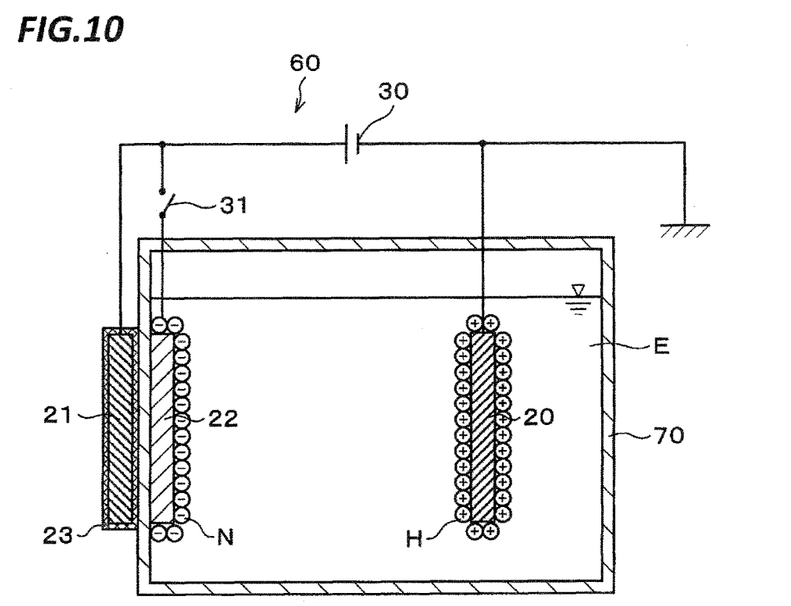
FIG. 10 is a vertical sectional view schematically illustrating a configuration of an etching treatment apparatus according to another exemplary embodiment.

For example, as illustrated in FIG. 10, an etching treatment apparatus 60 as an electrolytic treatment apparatus includes an etching liquid bath 70 that stores an etching liquid E as a treatment liquid therein. As for the etching liquid E, for example, a mixed liquid (HF/IPA) of hydrofluoric acid and isopropyl alcohol, or a mixed liquid of hydrofluoric acid and ethanol is used.

Also, the direct electrode 20 is connected to the negative electrode side of the DC power source 30, and each of the indirect electrode 21 and the counter electrode 22 is connected to the positive electrode side of the DC power source 30. Also, other configurations of the etching treatment apparatus 60 are the same as those of the plating treatment apparatus 1, and thus descriptions thereof will be omitted.

In such a case, by continuously applying a DC voltage in a state where the direct electrode 20 is set to a negative pole and the indirect electrode 21 is set to a positive pole, positively charged particles H migrate to the direct electrode 20 side, and treatment target ions N as anions in the etching liquid E migrate to the indirect electrode 21 side, that is, the counter electrode 22 side. Then, when sufficient treatment target ions N migrate to and accumulated on the counter electrode 22 side, a voltage is applied in a state where the direct electrode 20 is set to a negative pole and the counter electrode 22 is set to a positive pole so that the treatment target ions N on the surface of the counter electrode 22 may be oxidized and the surface of the counter electrode 22 may be etched. Then, the migration and accumulation of treatment target ions N, and the oxidation of the treatment target ions N are repeatedly performed, and thus a series of etching treatments are performed on the surface of the counter electrode 22.

In the present exemplary embodiment as well, although there is a difference in oxidation and reduction of the treatment target ions, the same effect as that of the exemplary embodiment described above may be enjoyed.

Figure 11:
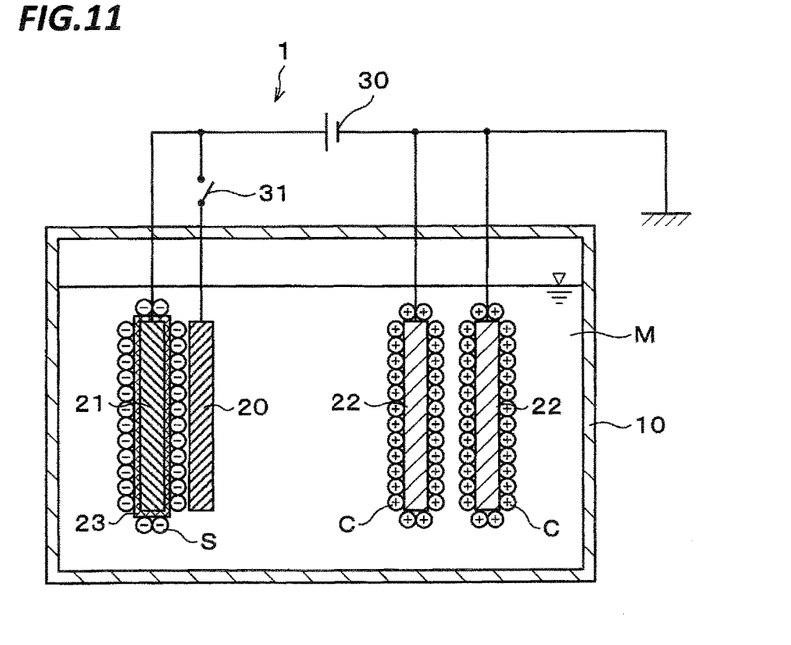
FIG. 11 is a vertical sectional view schematically illustrating a configuration of a plating treatment apparatus according to another exemplary embodiment.

Also, in the exemplary embodiment described above, a plurality of counter electrodes 22 may be provided as illustrated in FIG. 11. The plurality of counter electrodes 22 are arranged in parallel to the negative electrode side of the DC power source 30. Also, in the example of the plating treatment apparatus 1 illustrated in FIG. 11, a plurality of counter electrodes 22 are provided in the plating treatment apparatus 1 of FIG. 8. Also, in the example of FIG. 11, two counter electrodes 22 are provided, but the number of counter electrodes 22 may be arbitrarily set.

In such a case, when copper ions C migrate to the counter electrodes 22 side by applying a DC voltage in a state where the indirect electrode 21 is set to a positive pole and the plurality of counter electrodes 22 are set to a negative pole, the copper ions C are substantially uniformly accumulated on the surface of each of the counter electrodes 22. Then, the copper ions C on the surface of each of the counter electrodes 22 are substantially uniformly reduced by applying a voltage in a state where the direct electrode 20 is set to a positive pole and the counter electrodes 22 is set to a negative pole. As described above, according to the present exemplary embodiment, a plating treatment may be performed simultaneously and uniformly on the plurality of counter electrodes 22. As described in Patent Documents 1 and 2 mentioned above, in the conventional art, in a case where a plating treatment is performed, it is impossible to simultaneously perform the plating treatment on a plurality of counter electrodes while a direct electrode and counter electrodes are provided to face each other. In contrast, in the plating treatment apparatus 1 of the present exemplary embodiment, a plurality of counter electrodes 22 may be subjected to a batch processing.

Also, such a batch processing on the plurality of counter electrodes 22 may be applied to both oxidation and reduction of treatment target ions. In order to perform the oxidation and reduction, an electrolytic treatment may be performed by setting the arrangement of a positive electrode and a negative electrode of the DC power source 30 in reverse to set the positive pole and the negative pole in reverse.

Figure 12:
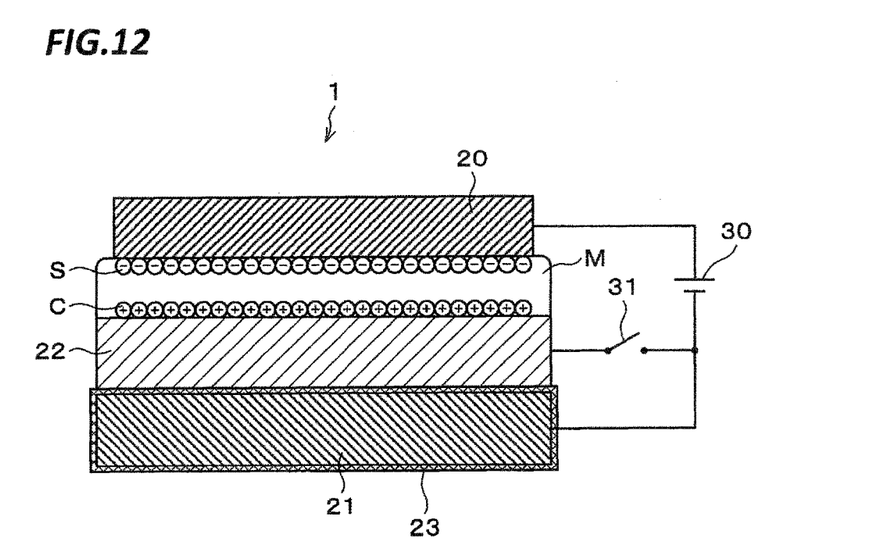
FIG. 12 is a vertical sectional view schematically illustrating a configuration of a plating treatment apparatus according to another exemplary embodiment.

The plating treatment apparatus 1 of the exemplary embodiment described above performs a plating treatment on the counter electrode 22 using the plating liquid M stored within the plating bath 10, but may perform a plating treatment by supplying the plating liquid M onto the counter electrode 22 as illustrated in FIG. 12.

For example, the plating liquid M is supplied to the top surface of the counter electrode 22 in a substantially plate-like shape. The plating liquid M stays on the counter electrode 22 by, for example, surface tension. The direct electrode 20 is further arranged on the plating liquid M. The indirect electrode 21 is arranged on the bottom surface of the counter electrode 22. The direct electrode 20 is connected to the positive electrode side of the DC power source 30, and each of the indirect electrode 21 and the counter electrode 22 is connected to the negative electrode side of the DC power source 30. The switch 31 is provided between the counter electrode 22 and the DC power source 30.

In such a case as well, copper ions C may migrate to the counter electrode 22 side by the indirect electrode 21 in the same manner as in the above described exemplary embodiment, and the copper ions C may be reduced by the direct electrode 20. Accordingly, the same effect as that of the exemplary embodiment described above may be enjoyed.

Figure 13:
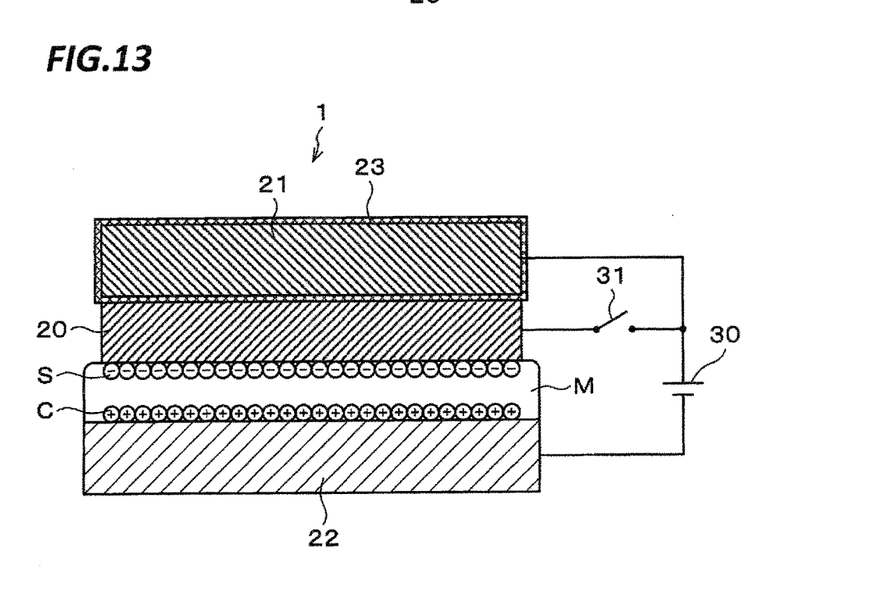
FIG. 13 is a vertical sectional view schematically illustrating a configuration of a plating treatment apparatus according to another exemplary embodiment.

Also, the indirect electrode 21 is provided on the bottom surface of the counter electrode 22 in FIG. 12, but may be provided on the top surface of the direct electrode 20 as illustrated in FIG. 13. In such a case, each of the direct electrode 20 and the indirect electrode 21 is connected to the positive electrode side of the DC power source 30, and the counter electrode 22 is connected to the negative electrode side of the DC power source 30. The switch 31 is provided between the direct electrode 20 and the DC power source 30. Then, copper ions C may migrate to the counter electrode 22 side by the indirect electrode 21, and the copper ions C may be reduced by the direct electrode 20.

Also, even in the case where the direct electrode 20, the indirect electrode 21, and the counter electrode 22 are arranged to be stacked as described above, both oxidation and reduction of treatment target ions may be performed. In order to perform the oxidation and reduction, an electrolytic treatment may be performed by setting the arrangement of a positive electrode and a negative electrode of the DC power source 30 in reverse to set the positive pole and the negative pole in reverse.

As above, a proper exemplary embodiment of the present disclosure has been described with reference to accompanying drawings, but the present disclosure is not limited thereto. To a person skilled in the art, it is clear that various changes or modifications may be made within the spirit scope described in the claims, and it is understood that they naturally belong to the technical scope of the present disclosure. The present disclosure is not limited to this exemplary embodiment but may take various aspects.

DESCRIPTION OF SYMBOL

1: plating treatment apparatus
10: plating bath
20: direct electrode
21: indirect electrode
22: counter electrode
23: insulating material
30: DC power source
31: switch
40: controller
50: copper plating
60: etching treatment apparatus
70: etching liquid bath
C: copper ions
E: etching liquid
H: charged particles
M: plating liquid
N: treatment target ions
S: sulfate ions

What is claimed is:

1. An electrolytic treatment method for performing a predetermined treatment using ions to be treated ("treatment target ions") contained in a treatment liquid, the electrolytic treatment method comprising:
    an electrode arrangement step of arranging each of a direct electrode and a counter electrode such that the treatment liquid is interposed therebetween, and arranging an indirect electrode to form an electric field in the treatment liquid;
    a treatment target ion migration step of causing the treatment target ions in the treatment liquid to migrate to the counter electrode side by applying a voltage to the indirect electrode; and
    a treatment target ion redox step of oxidizing or reducing the treatment target ions that have migrated to the counter electrode side by applying a voltage between the direct electrode and the counter electrode.

2. The electrolytic treatment method of claim 1, wherein in the electrode arrangement step, the direct electrode and the indirect electrode are separately arranged to face each other.

3. The electrolytic treatment method of claim 1, wherein in the electrode arrangement step, the direct electrode and the indirect electrode are arranged in a front-rear side integrated manner.

4. The electrolytic treatment method of claim 3, wherein in the electrode arrangement step, the direct electrode and the indirect electrode are integrally arranged such that a front surface of the direct electrode and a rear surface of the indirect electrode are abutted on each other.

5. The electrolytic treatment method of claim 3, wherein in the electrode arrangement step, the direct electrode and the indirect electrode are integrally arranged such that the direct electrode wholly covers the indirect electrode.

6. The electrolytic treatment method of claim 1, wherein in the electrode arrangement step, the indirect electrode and the counter electrode are separately arranged to face each other.

7. The electrolytic treatment method of claim 1, wherein in the electrode arrangement step, a plurality of counter electrodes are arranged.

8. The electrolytic treatment method of claim 1, wherein in the electrode arrangement step, the direct electrode, the indirect electrode, and the counter electrode are separately arranged to be immersed in the treatment liquid.

9. The electrolytic treatment method of claim 1, wherein in the electrode arrangement step, the treatment liquid is supplied onto a top surface of the counter electrode, and the direct electrode is arranged on the treatment liquid.

10. The electrolytic treatment method of claim 9, wherein in the electrode arrangement step, the indirect electrode is arranged on a bottom surface side of the counter electrode or on a top surface side of the direct electrode.

11. The electrolytic treatment method of claim 1, wherein the direct electrode is maintained in an electrical floating state.

12. The electrolytic treatment method of claim 1, wherein in the treatment target ion migration step, the voltage applied to the indirect electrode is a continuously applied DC voltage, and
    in the treatment target ion redox step, the voltage applied between the direct electrode and the counter electrode is a pulse voltage.

13. The electrolytic treatment method of claim 1, wherein in the electrode arrangement step, the counter electrode is arranged to be common to the direct electrode and the indirect electrode, and
    in the treatment target ion migration step, a voltage is applied between the indirect electrode and the counter electrode, and the treatment target ions are caused to migrate to the counter electrode side.

14. An electrolytic treatment apparatus for performing a predetermined treatment using ions to be treated ("treatment target ions") contained in a treatment liquid, the electrolytic treatment apparatus comprising:
    a direct electrode and a counter electrode that are arranged such that the treatment liquid is interposed therebetween, and further an indirect electrode configured to form an electric field in the treatment liquid, wherein the indirect electrode causes treatment target ions in the treatment liquid to migrate to the counter electrode side when a voltage is applied thereto, and the direct electrode reduces or oxidizes the treatment target ions that have migrated to the counter electrode side when a voltage is applied between the direct electrode and the counter electrode.

15. The electrolytic treatment apparatus of claim 14, wherein the direct electrode and the indirect electrode are separately arranged to face each other.

16. The electrolytic treatment apparatus of claim 14, wherein the direct electrode and the indirect electrode are arranged in a front-rear side integrated manner.

17. The electrolytic treatment apparatus of claim 16, wherein the direct electrode and the indirect electrode are integrally arranged such that a front surface of the direct electrode and a rear surface of the indirect electrode are abutted on each other.

18. The electrolytic treatment apparatus of claim 16, wherein the direct electrode and the indirect electrode are integrally arranged such that the direct electrode wholly covers the indirect electrode.

19. The electrolytic treatment apparatus of claim 14, wherein the indirect electrode and the counter electrode are separately arranged to face each other.

20. The electrolytic treatment apparatus of claim 14, wherein a plurality of counter electrodes are arranged.

21. The electrolytic treatment apparatus of claim 14, wherein the direct electrode, the indirect electrode, and the counter electrode are separately arranged to be immersed in the treatment liquid.

22. The electrolytic treatment apparatus of claim 14, wherein the treatment liquid is supplied onto a top surface of the counter electrode, and the direct electrode is arranged on the treatment liquid.

23. The electrolytic treatment apparatus of claim 22, wherein the indirect electrode is arranged on a bottom surface side of the counter electrode or on a top surface side of the direct electrode.

24. The electrolytic treatment apparatus of claim 14, wherein the direct electrode is maintained in an electrical floating state.

25. The electrolytic treatment apparatus of claim 14, wherein the voltage applied to the indirect electrode is a continuously applied DC voltage, and the voltage applied between the direct electrode and the counter electrode is a pulse voltage.

26. The electrolytic treatment apparatus of claim 14, wherein the counter electrode is provided to be common to the direct electrode and the indirect electrode, and the indirect electrode causes the treatment target ions to migrate to the counter electrode side when the voltage is applied between the indirect electrode and the counter electrode.

* * * * *